UNITED STATES PATENT OFFICE.

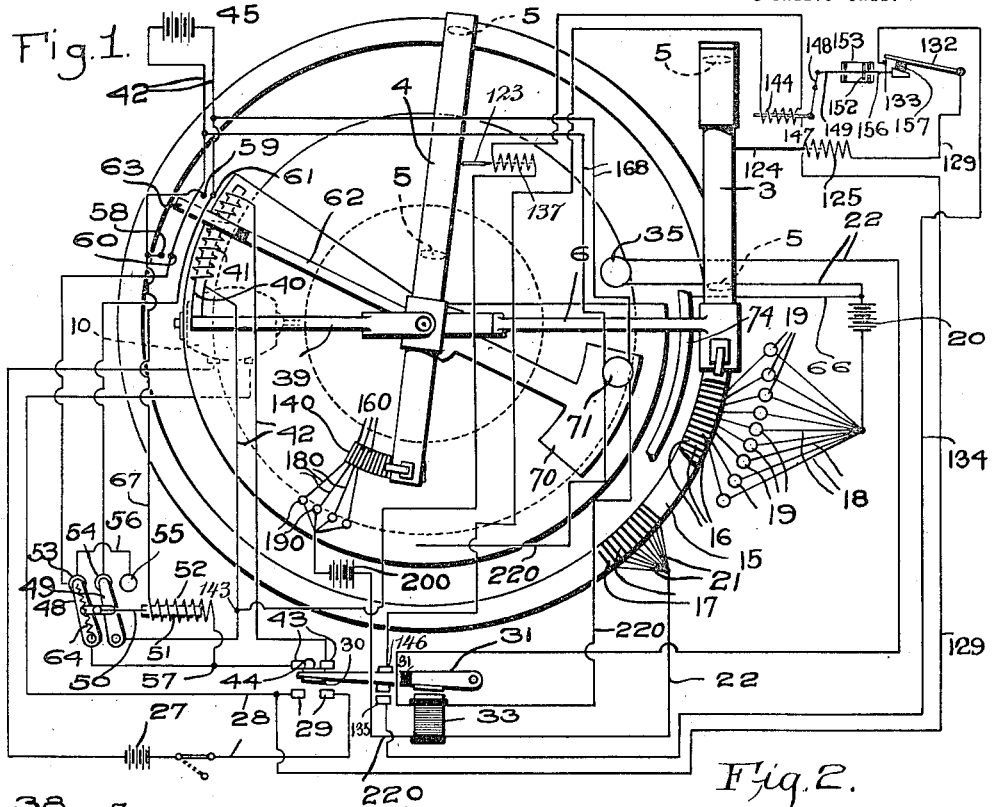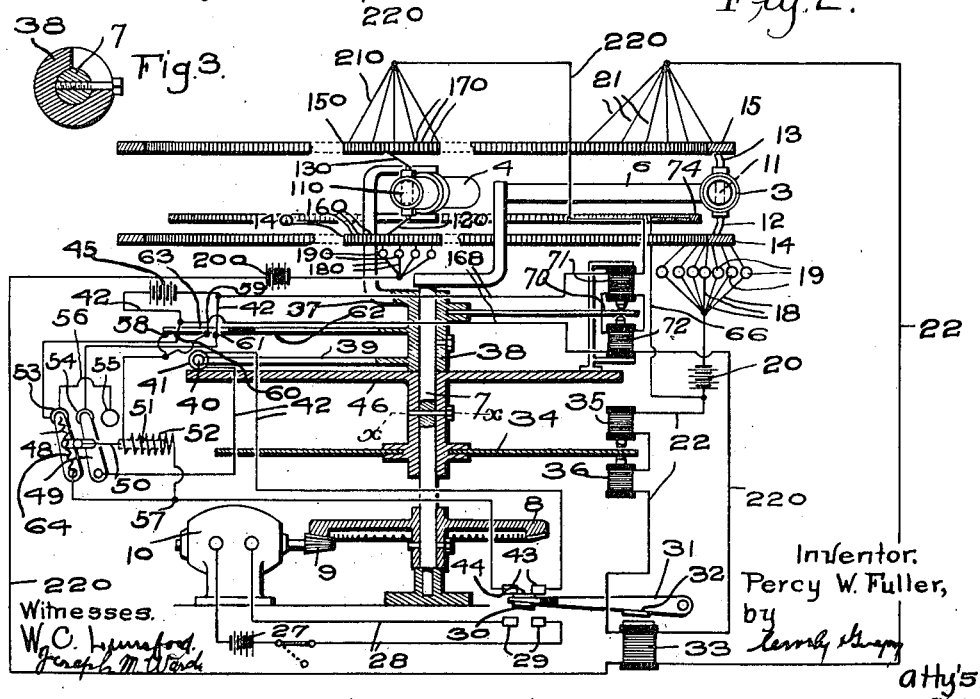

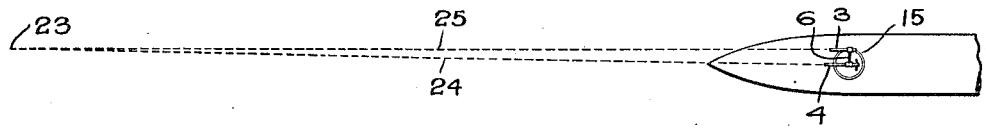
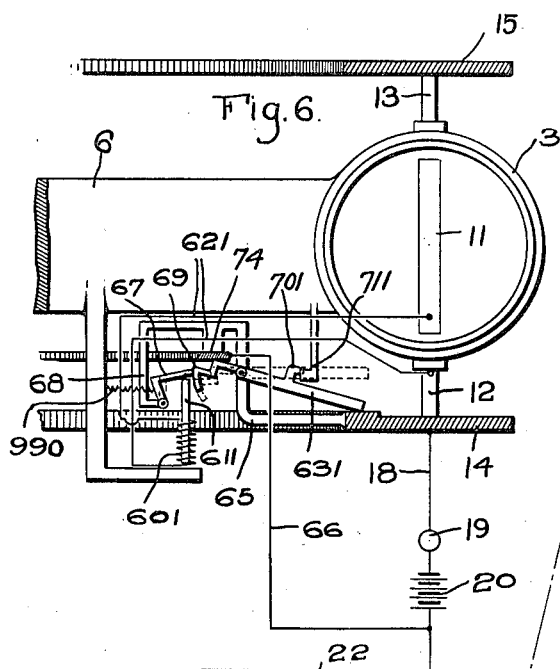
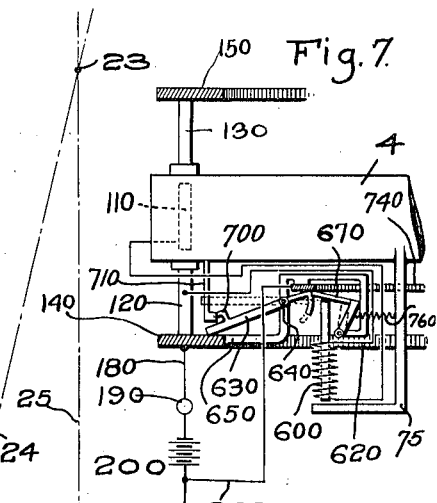
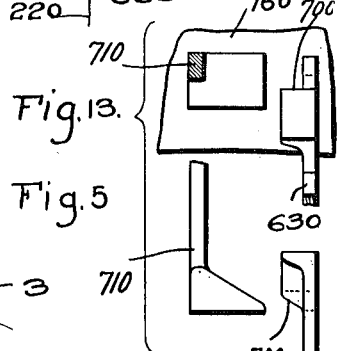
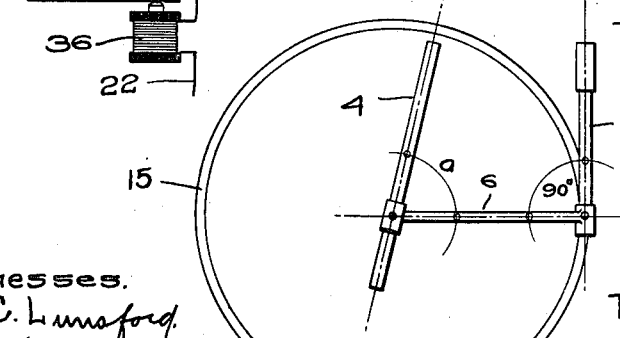

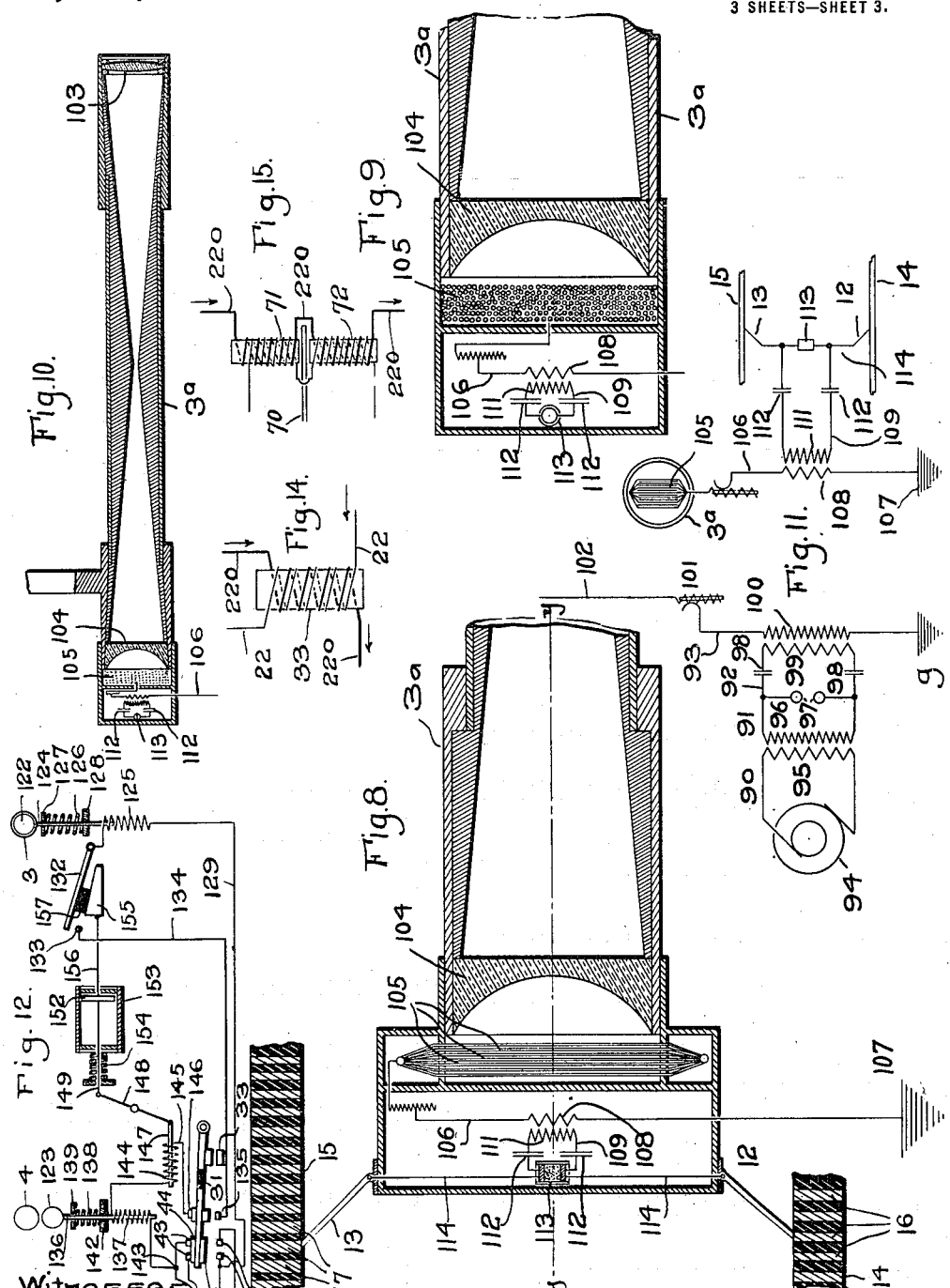

PERCY W. FULLER, OF BOSTON, MASSACHUSETTS, ASSIGNOR OF ONE-HALF TO AUGUST BERNARD PRAETSCH, OF BOSTON, MASSACHUSETTS.

SIGNALING APPARATUS.

1,149,123.   Specification of Letters Patent.   Patented Aug. 3, 1915.

Application filed February 1, 1908, Serial No. 413,754. Renewed December 11, 1914. Serial No. 876,740.

*To all whom it may concern:*

Be it known that I, PERCY W. FULLER, a citizen of the United States, residing at Boston, county of Suffolk, and State of Massachusetts, have invented an Improvement in Signaling Apparatus, of which the following description, in connection with the accompanying drawing, is a specification, like letters on the drawing representing like parts.

This invention has for its object to provide a novel apparatus by which both the distance and direction of an object from a given point can be determined. The apparatus is arranged to be actuated by energy in the form of transverse waves and the determination of the distance and direction of a distant object from a given observation point is made by the use of transverse waves projected from said distant object and received at the observation point.

The complete apparatus comprises a transmitting apparatus to project waves, and a receiving apparatus to receive the projected waves. The receiving apparatus is constructed with an indicator which automatically indicates not only the direction from which the received waves have been projected, but also indicates the distance which said waves have been projected. The indicating apparatus is situated so that it can be readily seen and the complete apparatus is constructed so that no manual manipulation thereof is required, as the indicator will automatically indicate to the observer the desired information.

My invention is especially useful in connection with ships at sea for enabling one ship to determine the location of any other adjacent ships. Where it is used in this way, each ship should be equipped with both a transmitting apparatus and a receiving apparatus, so that each ship may not only project the transverse waves toward other ships, but may receive waves projected from other ships and thus automatically indicate the position and location of such ships. The invention, however, is not by any means limited for use in locating ships at sea, as it can be used on land equally as well as at sea and will be useful for determining both the direction and distance of various objects from a given point.

In the preferred embodiments of my invention, I propose to use transverse waves which are not materially interfered with by fog, smoke or atmospheric conditions, so that my apparatus is capable of locating a distant object regardless of weather conditions and in the night time as well as in the day time.

In the drawings I have shown two embodiments of my invention, one of which is especially adapted for use in connection with transverse waves in the form of light rays, and especially ultra-violet rays, and the other of which is especially adapted for use in connection with electrical waves. The principle on which the apparatus operates is the same in both instances, however, and the difference between the two embodiments is simply such difference as is necessitated by the use of one character of transverse waves in place of the other.

Referring now to the drawings wherein two embodiments of the invention are shown, Figure 1 is a plan view of a receiving apparatus adapted to be used in connection with ultra-violet rays; Fig. 2 is a vertical sectional view thereof; Fig. 3 is a section on the line *x—x*, Fig. 2; Fig. 4 is a plan view of a boat showing the method of mounting my apparatus thereon; Fig. 5 is a more or less diagrammatic view showing the principle involved in the determination of the distance of a distant object; Figs. 6 and 7 are details which will hereinafter be referred to; Fig. 8 shows a part of the receiving apparatus adapted for use in connection with electrical waves; Fig. 9 is a section on the line *y—y*, Fig. 8; Fig. 10 is a longitudinal section through the wave receiver adapted for the reception of electrical waves; Fig. 11 is a diagrammatic view illustrating a transmitting and receiving apparatus; Fig. 12 is a diagrammatic view showing an arrangement of shutters for the wave receiver; Fig. 13 is a fragmentary view of the devices for operating the circuit closers 630; Fig. 14 is a diagrammatic view showing the winding for the magnet 33; Fig. 15 is a similar view showing the winding for the magnets 71 and 72.

The transmitting apparatus may have any suitable or usual construction adapted to project the transverse waves of the required character. Where the apparatus is one adapted to be operated by ultra-violet rays, the transmitting apparatus may be of any suitable character adapted to project such rays. An arc lamp having the carbons impregnated with magnesium constitutes a strong source of ultra-violet rays and may conveniently be used as the transmitting apparatus. Where the apparatus is designed to be operated by electrical waves, the transmitting apparatus may be of any suitable construction adapted to create and project electrical waves.

The receiving apparatus comprises two wave receivers and means to indicate when waves are received in said receivers, said means operating to indicate also the direction from which the waves are projected. One only of these wave receivers is used in determining the direction, and said wave receiver is preferably mounted so that it can be turned into different angular positions thereby permitting it to be directed in any direction. Suitable means are provided for turning this wave receiver into its different positions, and means are provided for indicating whenever transverse waves are received by the wave receiver and the position of said wave receiver when the waves are so received. Said wave receiver is so arranged that in any one position it will receive waves from one direction only and by being able to determine when waves are received by the wave receiver and its position at such time, the direction from which the waves are projected can be readily determined, and thus the direction of the distant object can be determined.

The distance of the object is determined by the trigonometrical principle commonly used for determining the length of one side of the triangle when the length of one of the other sides and all three angles are known. For accomplishing this object, the two wave receivers are placed a known distance apart and one of them is arranged at right angles to a line connecting them. Whenever the two wave receivers are positioned so that each is directed toward the source from which the transverse waves emanate so that waves are received by both, the distance of said object can be readily determined if the distance between the two wave receivers and the angles which said wave receivers make with a line joining them is known.

One wave receiver is preferably arranged at right angles to said line and therefore the angle which it makes with said line is a constant. The other wave receiver has associated therewith an indicator which is rendered operative by transverse waves received by the wave receiver to indicate automatically the angle which said wave receiver makes with a line joining the two wave receivers, and thus the three angles of the triangle are known and the length of one side of the triangle which is the distance between the wave receiver and the distant object can be readily determined.

Referring now to Figs. 1 and 2 wherein is shown in detail a form of receiving apparatus which is especially designed for use in connection with transverse waves in the form of ultra-violet rays, 3 is the wave receiver which is used for indicating the direction only, and 4 the wave receiver which is used in connection with the wave receiver 3 for indicating the distance. The wave receiver 3 is in the form of a tube having lenses 5 therein which are adapted to focus the ultra-violet rays at a focal point within the tube. Said tube is arranged to be turned into different angular positions to permit it to pick up or receive rays from any direction. For this purpose, I have shown it mounted upon an arm 6 which in turn is carried by a shaft 7 that is supported in suitable bearings and which is rotated in any suitable way, as by a motor 10. This motor is shown as provided with a gear 9 which meshes with a gear 8 fast to the shaft. The operation of the motor turns the shaft and causes the wave receiver 3 to be carried around in a circle and thus to be pointed in every direction. To indicate when ultra-violet rays are received by the wave receiver 3, I have in this embodiment provided a plurality of normally-open circuits, each of which has a signal or a lamp therein and each of which corresponds to a particular position of the wave receiver 3, and I have also provided means sensitive to said transverse waves which are adapted to close the circuit corresponding to a given position of the wave receiver whenever ultra-violet rays are received by said receiver in such position. For accomplishing this, I provide the wave receiver 3 with some material situated at the focal point thereof, the electrical resistance of which varies with the amount of light directed thereon. Selenium is such a material and I find it convenient to use a selenium cell 11 for this purpose. Said cell may be of any suitable or usual construction and it is situated at the focal point of the wave receiver. It has connected thereto two brushes or terminals 12 and 13 which are adapted to wipe over rings 14, 15 as the wave receiver 3 rotates. These rings are each made up of a plurality of insulated sections, the sections in the ring 14 being designated 16 and being shown best in Fig. 1, and those in the ring 15 being designated 17 and also being best shown in Fig. 1. There are the same number of sections in each of the rings, and each of the sections forms part of one of the indicating circuits.

Connected to each of the sections 16 is a circuit 18 having a signal 19 therein. The signal may simply be a lamp which will be caused to glow when the circuit is closed, or it may be any other suitable device adapted to give indication when the circuit is closed.

The lamp circuits 18 are all connected to a battery 20 or other source of electrical energy. The insulated sections 17 are all connected by wires 21 to a common return 22 which eventually leads back to the battery. The return circuit 22 is connected to magnets 33, 35 and 36, whose function will be more fully described hereinafter.

The selenium cell 11 may have any suitable construction, and it has a resistance sufficient to prevent current from flowing under normal conditions, and therefore each of the signal circuits 18 is normally open, and none of the signals 9 will be operated when the arm 6 rotates. Whenever ultra-violet rays projected from a distant point are received by the wave receiver 3, however, such rays are focused by the lenses 5 on the selenium cell 11 and by their action they reduce the electrical resistance of said cell sufficiently to permit the current to flow and when this occurs current will flow in that particular circuit 18 corresponding to the position of the wave receiver 3. By a proper arrangement of the signals it will be evident that whenever ultra-violet rays act on the cell 11, a person can readily tell the direction in which the wave receiver is pointing and consequently the direction from which the rays are projected by simply noting which particular signal is in operation. Since the wave receiver 3 is adapted to sweep the horizon and point in every direction, it will be evident that if during its rotation it is trained upon a distant object from which ultra-violet rays are being projected, such fact will immediately be indicated by the signal 19. In this way the direction of the distant object can be determined.

For indicating the distance of the object, the wave receiver 4 is used conjointly with the wave receiver 3. The principle employed in thus determining the distance is illustrated graphically in Fig. 5 wherein 3 and 4 are the two wave receivers and 23 is the distant object. The length of the arm 6 is a known quantity and since the wave receiver 3 is fixedly carried by the arm, the angle between the wave receiver and said arm is a known quantity. If both the wave receivers 3 and 4 are trained on the distant object 23, the lines of projection of the rays from said object 23 to each of the wave receivers (which lines are illustrated graphically by the dotted lines 24, 25) together with the arm 6 form a triangle, one side of which and an adjacent angle are constant. If, therefore, some means is provided for determining the angle $a$ between the wave receiver 4 and the arm 6, the three angles of the triangle will be known and the length of one side, and from this data, the length of the other sides of the triangle can be readily computed.

I have associated with the wave receiver 4 an indicating apparatus which will indicate automatically whenever ultra-violet rays are received by said wave receiver. Since the length of the arm 6 and the angle between said arm and the wave receiver 3 are both constants, the distance of the distant object 23 from the receiving apparatus will always have a definite relation to the angle $a$, and in order to avoid mathematical computations, I propose to use an indicating device which is adapted to indicate directly the distance instead of the angle $a$.

The wave receiver 4 is similar in construction to the wave receiver 3, it having lenses 5 which are adapted to focus the ultra-violet rays upon a selenium cell 110. This selenium cell has connected therewith two brushes or wipers 120, 130 which are adapted to engage two strips 140 and 150. Each strip is made up of a plurality of insulated sections, the insulated sections of the strip 150 being designated 170, and those of the strip 140 being designated 160. The strip 150 is omitted from Fig. 1 to better show the parts beneath it. Each insulated section 160 is connected to a signal circuit 180 and each signal circuit has therein a signal 190 which may be an ordinary lamp. The signal circuits are all connected to a source of electrical energy 200. Each of the sections 170 is connected by a wire 210 to a return circuit 220 which ultimately leads back to the source of electrical energy 200. There are several magnets connected to the return circuit 220 and the function of these will be explained later. With such a construction whenever an ultra-violet ray is received by the wave receiver 4 and is focused on the selenium cell 110, the resistance of said cell will be reduced and the current will flow in one of the circuits 180, thereby lighting the corresponding signal 190.

The different signals 190 correspond to different angular positions of the wave receiver 4 relative to the arm 6, and I propose to provide a notation for said signals which will give the distance corresponding to the angles.

In order to determine the distance it is necessary that both wave receivers 3 and 4 be trained at the same time on the distant object from which the ultra-violet rays are emanating, and I have provided, therefore, a device for automatically stopping the movement of the wave receiver 3 whenever ultra-violet rays are received by said wave receiver, and at the same time automatically swinging the wave receiver 4 into different angular positions until it is in position to receive said rays, and then bringing said wave receiver 4 at rest in this position. When the wave receivers are thus both trained on the distant object 23, the two signals 19 and 190 which are operated will give both the direction and the distance of the object.

For automatically stopping the rotation of the wave receiver 3 at the proper time, I have provided the following mechanism. The motor 10 is connected to a source of electrical energy 27 by means of a circuit 28 and this circuit has therein two separated terminals 29 which are adapted to be connected by a switch 30. This switch is mounted on a pivoted arm 31 which carries a polarized armature 32 that is adapted to coöperate with a magnet 33. Said magnet has two separate windings, one of which is connected in series with the return 22, and the other of which is connected in series with the return 220 (see Fig. 14). The winding in the circuit 22 is in such a direction that when current flows in the circuit, the armature 32 will be repelled, and the winding in the return circuit 220 is in such a direction that when current flows in said circuit the armature will be attracted.

The arm 31 is normally in its lowered position with the switch 30 bridging the contacts 29, thus completing the motor circuit. Whenever the current is permitted to flow in any one of the circuits 18 by the breaking down of the resistance of the selenium cells 11, the armature 32 will be repelled and the arm 31 will be thrown into the full position Fig. 2, in which position it breaks the motor circuit. As soon as the motor circuit is broken, the motor is automatically brought to rest by a brake or drag which may conveniently comprise a copper disk 34 which is fast to the shaft and which plays between two magnets 35 and 36, the windings of which are in the return circuit 22. As soon as said magnets are energized, they produce a dragging effect upon the disk 34 in a well known manner and thus bring the shaft 7 to rest. This dragging effect is applied simultaneously with the breaking of the motor circuit, as will be obvious, and the construction, therefore, provides for stopping the operation of the wave receiver 3 whenever ultra-violet rays are received thereby.

The wave receiver 4 normally rotates about the shaft 7 as an axis simultaneously with the wave receiver 3, and as stated above, whenever the wave receiver 3 is brought to rest, means are automatically set in operation for vibrating the wave receiver 4 until it is trained on the distant object from which the ultra-violent rays are projected when said wave receiver will be brought to rest. To accomplish these results, the wave receiver 4 is mounted in a bracket 37 which is provided with a hub 38 that is mounted on the shaft 7, but which is capable of slight turning movement thereon, as seen in Fig. 3. This hub has rigid therewith an arm 39 provided with a curved extension 40 which acts as a polarized core for a coil 41 in a circuit 42. This circuit has therein two separated terminals 43 which are adapted to be closed by a switch 44 also carried by the pivoted arm 31, but insulated from the switch 30. The circuit 42 also includes a source of electrical energy 45 and a current-reversing device which is adapted to reverse the direction of the current through the coil 41. When the current flows in one direction through said coil 41, the core 40 will be sucked into the coil, thus swinging the wave receiver 4 in one direction, and when the current is reversed, the core will be sucked in the opposite direction, thus swinging the wave receiver 4 in the other direction. The coil 41 is shown as mounted on a platform 46 which is rigid with the shaft 7 so that said coil always rotates with the wave receiver 3. Any suitable current-reversing device may be employed. That herein shown comprises two pivoted switch arms 48 and 49 which are in the two sides of the circuit 42 and which are connected by a link 50 with a polarized core 51 that operates in a coil 52. Said device also comprises the three terminals 53, 54 and 55. The terminals 53 and 55 are connected by the wire 56, and are in one side of the circuit 42, and the terminal 54 is in the other side of said circuit. With this construction when the two switch arms 48 and 49 are in the position shown in Figs. 1 and 2, the current will flow from the battery 45 through the coil 41 in one direction, and when said switch arms are swung to the right, said current will flow through the coil in the opposite direction, as will be obvious.

The coil 52 and its core 51 are used for operating the switch arms 48, 49, and the direction of the current in said coil is reversed by the movement of the wave receiver 4. To accomplish this one end of the coil 51 is connected to one side of the circuit 42 at 57 and the other end of said coil is connected to two terminals 58 and 59. The terminal 58 is situated adjacent a terminal 60 in one side of the circuit 42 and the terminal 59 is adjacent another terminal 61 in the other side of the circuit 42.

The hub 38 has extending therefrom an arm 62 which carries at its end an insulated contact 63 which in one position will bridge the two contacts 59, 61, and in another position will bridge the two contacts 58, 60.

The switch arm 48 may be provided with some suitable resistance 64 so that when the parts are connected, as shown in Figs. 1 and 2, the potential at the point 57 will be somewhat higher than at the point 60. When, however, the arm 48 has been swung to the right to connect with the terminal 54, then the potential at the point 61 will be considerably higher than at the point 57. With this construction it will be seen that when the contact 63 bridges the contacts 59, 61, the current will flow from the contact 61 to contact 59 and through the circuit 67 and coil 52 to the point 57, while when said contact 63 bridges the contacts 58, 60, the current will flow from the contact 57 through the circuit 67 and coil 52 to the contact 60. In the first instance the current flows in one direction through the coil 52 and in the other instance it flows in the opposite direction. The swinging movement of the arm 62, therefore, will operate to reverse the direction of the current in the coil 52 and thus to operate the current-reversing device. The current-reversing device, as above described will operate to reverse the current in the coil 41 and thus to cause the wave receiver 4 to oscillate. Whenever the wave receiver 4 is finally trained on a distant object from which ultra-violet rays are projected and such rays are focused on the selenium cell 110, said wave receiver is automatically brought to rest, and to accomplish this I provide the hub 38 with a retarding plate 70 which plays between two magnets 71 and 72 which are mounted on the platform 46 and the coils of which are in the return circuit 220, so that whenever current flows in any one of the circuits 180, said magnets are energized and produce a dragging or brake effect on the disk 70, thus bringing the wave receiver 4 to rest. I have also provided means whereby as soon as the wave receiver 4 has been brought to rest, as above described, the motor circuit will be again closed and the wave receiver 3 will begin its rotation again. This is accomplished by connecting the return circuit 220 with a winding on the magnet 33 which is so arranged that as the current flows through the return circuit, the said magnet will be energized thereby to attract the armature 32 (see Fig. 14). When this occurs, the arm 31 will swing downwardly, Fig. 2, thereby breaking the circuit at the contacts 43 and at the same time closing the motor circuit. The motor will then automatically start up and begin again the rotation of the shaft 7 and the wave receiver 3. If during the rotation of said shaft any ultra-violet rays are again received by the wave receiver 3, the operations above described will be repeated. The construction thus far described operates, therefore, to rotate the wave receiver 3 and maintain it in rotation until ultra-violet rays are received when said wave receiver is automatically brought to rest, and it also operates to cause the wave receiver 4 to oscillate as soon as the wave receiver 3 has been brought to rest until said wave receiver 4 is trained on the object projecting the ultra-violet rays when the said wave receiver 4 will be brought to rest. As soon as the wave receiver 4 is brought to rest the motor is again started for rotating the wave receiver 3. While the wave receiver 3 is rotating, it is desirable that the wave receiver 4 should also be rotated at the same speed and to maintain the relative positions of the wave receivers 3 and 4 while the wave receiver 3 is rotating, I have provided means for producing a permanent or continuous drag on the plate 70. As seen in Figs. 2 and 15, the magnets 71 and 72 are provided with a winding which is connected in the circuit 168 which connects to the circuit 42 each side of the battery 45. This circuit constitutes a closed shunt circuit in which sufficient current is continuously flowing to produce sufficient continuous dragging on the plate 70 to normally maintain the relative positions of the two wave receivers. This dragging effect, however, is not sufficient to prevent the wave receiver 4 from being oscillated by the action of the coil 41, as above described.

It is desirable that the signals 19 and 190 should remain in operation for a period of time longer than that in which the wave receivers 3 and 4 are stationary in order to afford sufficient time to accurately read the indicating device. In the present embodiment I have provided an arrangement whereby both of said signals will continue in operation after the wave receiver 3 commences its rotation again, and will continue in operation until said wave receiver has made a complete rotation, thus giving the operator sufficient time to properly read the signals of the indicating device and determine the position of the distant object. The mechanism shown in Figs. 6 and 7 is designed to accomplish this result. Fig. 6 shows the mechanism coöperating with the wave receiver 3, and Fig. 7 shows that coöperating with the wave receiver 4. This mechanism is omitted from Figs. 1 and 2 in order to avoid confusion.

The arm 6 which carries the wave receiver 3 also sustains a solenoid 601 having a fixed core 611, the coils of which solenoid are in a circuit 621 that connects the brush 12 and the selenium cell 11, so that the coils of said solenoid are in series with the selenium cell, and whenever the current flows in any one of the circuits 18 the solenoid 601 will be energized.

The annular ring 14 sustains a plurality of circuit closers 631 there being one such circuit closer for each of the segments 16 in said ring. Only one of these circuit closers is shown in Fig. 6. Each circuit closer is pivoted on an arm 65 extending from the ring 14; and each circuit closer is of such a shape that when it is in the full line position, Fig. 6, one end thereof contacts with the segment 16 and the other end contacts with a ring 74 which may also be sustained by the various arms 65. The ring 74 is connected with the source of electrical energy 20 by means of a circuit 66. Each of the circuit closers 631 is normally sustained in the dotted line position, Fig. 6, in which position it is out of contact with both the rings 14 and 74. Each circuit closer has cooperating therewith a polarized latch 67 which is pivoted to some suitable fixed support, as, for instance, an extension 68 of the arm 65, and which normally overlies the tail 69 of the circuit closer and operates to hold the circuit closer in its elevated position. Each latch is backed by a push spring 990.

The construction of the solenoid 601 is such that when a current flows therethrough the particular locking latch 67 which happens to be directly over said solenoid will be repelled, thus releasing the corresponding circuit closer and allowing it to fall into the full line position Fig. 6, in which position it short circuits the main circuit 22, 15, 13, 11, 601, 12.

It will be remembered that the solenoid 601, is in the circuit including the selenium cell, and, therefore, whenever the resistance of said cell is broken down thereby to allow the current to flow, the circuit closer 631 corresponding to the particular segment 16 with which the brush 12 at that instant has engagement will be released and a short circuit will be produced including the battery 20, circuit 66, ring 74, circuit closer 631, segment 16 and signal circuit 18. The circuit closer will remain in this position until the wave receiver 3 has made another complete rotation, and since the signal circuit is maintained closed by the circuit closer, the signal will remain in operation not only while the wave receiver 3 is at rest, but also after it begins to rotate again. I have also provided for opening this short circuit when the wave receiver completes its rotation so that the operation of the signal 19 will cease. For this purpose each circuit is provided with a nose 701 and the arm 6 is provided with a foot 711 having an inclined surface which is adapted to engage the noses of those circuit closers which are in operative position thereby to lift the circuit closers into the dotted line position. As said circuit closers are thus lifted the springs 99 will cause the latches 67 to snap over the tails 69 and maintain them in this position until they are again released by the reception of a beam of ultra-violet rays by the wave receiver 3.

In Fig. 7 I have shown a similar arrangement for maintaining the signals 190 in operation after the wave receiver 4 has begun to rotate again. As shown in said figure the wave receiver 4 has secured thereto an arm 75 which carries a solenoid 600 having a fixed core, and the coils of the solenoid are connected by the circuit 620 with the selenium cell 110 and with the brush 120 so that said solenoid is also in series with the selenium cell.

Each segment 160 has associated therewith a circuit closer 630, said circuit closer being suitably pivoted at 640 on arms 650 which extend from the segments 160. These arms also are extended to carry pivoted locking latches 670 one for each of the circuit closers, said latches being backed by push springs 760.

740 is an insulated terminal which is connected with the battery 200 by a wire 660. Normally the circuit closers 630 are in their elevated positions, as shown by dotted lines, and are held in such position by the latches 670.

Whenever the resistance of the selenium cell 110 is broken down by ultra-violet rays thereby permitting the current to flow through one of the signal circuits 180, the solenoid 600 will be energized, thereby repelling the polarized latch 670 which happens to be directly over said solenoid and releasing the corresponding circuit closer 630. The circuit closer when released will drop thereby establishing a short circuit for the particular signal 190 which is set in operation, and this short circuit will continue and the signal will remain in operation until the circuit closer is again elevated.

The return of the circuit closer to its initial position is accomplished by a foot 710 secured to the wave receiver 4 and having an inclined surface adapted to engage the nose 700 of the depressed circuit closer.

As the circuit closer is elevated, the tail end thereof automatically engages the latch 670, throws the latter back, and as the circuit closer reaches its horizontal position the latch swings over the tail under the impulse of a suitable spring 760.

The embodiments of my invention thus far described are such as are adapted for use in connection with transverse waves in the form of ultra-violet rays. In Figs. 8 to 11 I have shown embodiments of my invention which are adapted for use in connection with electrical waves which are also transverse waves. The difference between an apparatus embodying my invention which is designed to be operated by ultra-violet rays and one which is designed to be operated by electrical waves lies principally in the construction of the wave receivers, and in the transmitting apparatus. The indicating part of the apparatus may be the same in both embodiments of my invention.

Where ultra-violet rays are used, the wave receivers are especially constructed, as above described, to receive the ultra-violet rays and to permit the current to flow in one of the signal circuits when such rays are received by the wave receiver.

An embodiment of my invention adapted to be operated by electrical waves requires a wave receiver which is constructed so that when electrical waves are received thereby, the current will flow in the signal circuit.

Any suitable transmitting apparatus for producing and projecting the electrical waves may be employed, although in Fig. 11 I have shown the transmitting apparatus which is preferred by me and which comprises the two internal circuits 90 and 91, the former having the alternator 94 and the primary 95 of a transformer therein and the latter having the secondary 96 of said transformer and the spark gap 97 therein; and the closed and open oscillator circuits 92, 93, the former having the condensers 98 and the primary 99 of a transformer therein, and the latter having the secondary 100 of said transformer and the variable inductance 101 therein, said latter also connecting with the ground $g$ and including the aerial wire 102.

The wave receivers are preferably made in tubular shape and are provided with wave-focusing means and also with a suitable receiving mechanism to receive the waves and convert them into electrical oscillations.

Referring now to Fig. 10 which shows a horizontal section through a wave receiver, it will be seen that it comprises the tubular member 3ª having the lenses 103, 104 which are of a material to transmit the waves and are of a shape to focus said waves. The receiving mechanism comprises the usual open resonator system which receives electrical waves and transforms them into electrical oscillations, and an internal circuit having a coherer therein which circuit is also connected with the brushes or contacts 12 and 13 or 120 and 130 of the wave receiver. The resonator system is shown as comprising a plurality of wires 105 which are connected in parallel and are in position to be impinged on by the electrical waves focused by the lenses 103, 104, and which wires form part of the open circuit 106 that is grounded at 107, said circuit having therein the primary 108 of a transformer.

The internal circuit 109 comprises the secondary 111 of said transformer, two condensers 112 and a coherer 113 of suitable construction. The coherer is also in a circuit 114 which connects with the brushes 12 and 13.

The construction of both of the wave receivers used in connection with the apparatus when the latter is adapted to be operated by electrical waves is the same as that above described.

Under ordinary conditions the resistance of the coherer is sufficient so that no current will flow in the circuit 114 which circuit corresponds to that of the selenium cell in the embodiments above described. Therefore, so long as no electrical waves are received by the apparatus, no current will flow in any of the signal circuits 18 or 180. As soon, however, as electrical waves are received by the apparatus they are converted into electrical oscillations in the open circuit 106, which oscillations acting through the circuit 109 operate to break down the resistance of the coherer sufficiently to permit the current to flow in the circuit 114. One of the signals will then be operated, as above described, and indication of the fact that the electrical wave has been received is thus made. As soon as the signal in one of the circuits 18 is thus set in operation the wave receiver 3ª will be brought to rest and the other wave receiver will then be set in oscillation, all as above described, until electrical waves are received by it when one of the signals 190 will be set in operation and said wave receiver will be brought to rest, all as above described.

I propose to make the wave receivers in the form of cylinders as above described and of a material, such as zinc, which will not transmit electrical waves. Where the wave receivers are made in this form they will not pick up any electrical waves except those projected in the direction of the length of the wave receiver, and therefore they will not be operated by any electrical waves projected in a direction transverse to that of the wave receiver.

In addition to the above features I have provided a shutter arrangement which coöperates with the wave receivers to exclude waves therefrom at definite intervals. The shutter arrangement is so devised that the wave receiver 3 is normally open, while the wave receiver 4 is normally closed. As soon as the wave receiver 3 has picked up a transverse wave and has been brought to rest, as above described, the shutter for said wave receiver closes and the shutter for the wave receiver 4 is opened. Said wave receiver 4 then oscillates until it picks up the waves projected from the distant object and the indicator associated with said wave receiver 4 is operated. After the wave receiver 3 has again started in motion, as above described, the shutter for said wave receiver is opened and that for the wave receiver 4 closes, and this condition will continue until waves have been picked up by the wave receiver 3 again when the operation above described is repeated.

The shutters employed for these wave receivers may be of any suitable construction adapted to exclude or prevent the transmission of transverse waves. A shutter made of zinc will answer for this purpose. The shutter mechanism is shown diagrammatically in Fig. 12 and also in Fig. 1, but is omitted from Fig. 2 in order to avoid confusion. The parts in Figs. 12 and 1 are in the position they occupy when the shutter for the wave receiver 3 is closed and that for the wave receiver 4 is open, this being the position of the parts after the wave receiver 3 has been brought to rest and while the wave receiver 4 is being oscillated to locate the distant object. The shutter for the wave receiver 3 is designated 122 and the shutter for the wave receiver 4 is designated 123. The shutter 122 is carried by a rod or support 124, one end of which constitutes a core for the coil 125. Said shutter is adapted to be inserted into the wave reciver 3 to intercept the waves traversing through said wave receiver. Said shutter is held in its normal position, which is a position to close the wave receiver 3, as shown in Figs. 1 and 12, by any suitable means, such as a spring 126, which surrounds the rod 124 and engages at one end a collar 127 on said rod and at its other end rests on a fixed support 128. The coil 125 is connected by a wire 129 with the circuit 28, and said coil is also connected to a circuit breaker or switch 132 which is shown as pivoted and is adapted to contact with a contact 133, said contact being connected by a wire 134 with a contact 135. The contact 135 is situated to be engaged by the arm 31 when the latter is in its lowered position bridging the contact 29. The shutter 123 is similarly mounted on a rod 136, the lower end of which constitutes a core for a coil 137. The shutter 123 is normally held in its elevated position to close the wave receiver 4 by means of a spring 138 which surrounds the rod and engages at one end a collar 139 fast thereon and at its other end a fixed support 142. One end of the coil 137 is connected to the circuit 42 at 143 and the other end connects with a coil 144, said coil 144 being connected by a wire 145 to a contact 146 situated to be engaged by the lever 31 when it is elevated, as shown in Figs. 1, 2 and 12.

The coil 144 has a core 147 which is connected at one end with a pivoted lever 148, the other end of which lever is connected to a piston-rod 149 carrying a piston 152 playing within a dash-pot or cylinder 153. Said piston-rod is normally acted upon by a spring 154 which tends to move it to the left, Fig. 12. Said piston-rod is also connected by means of a rod 156 to a sliding wedge block 155 on which the switch 132 rests, said switch being insulated from the block by suitable insulation 157. When the parts are in their normal position with the lever 31 lowered to close the motor circuit 28, the circuit through the coils 137, 144 will be broken and both coils will, therefore, be deënergized. When they are thus deenergized, the spring 138 serves to close the shutter 123 and the spring 154 serves to force the piston 152 to the left and withdraw the sliding wedge block 155 from beneath the switch 132. Said switch 132, therefore, rests against the contact 133 and the circuit including the coil 125 is closed. When this is the case, said coil is energized and the core or rod 129 is drawn downwardly thereby opening the shutter 122. This is the normal position while the motor 10 is in operation and the wave receiver 3 is rotating. As soon as transverse waves have been received by the wave receiver 3, the magnet 33 is energized, as above described, thereby to repel the lever 31 and throw it into the position shown in Figs. 1, 2 and 12, in which position it closes the circuit 42 and sets the wave receiver 4 in oscillation, as above described. When the lever 31 is in this position it closes against the contact 146, thus closing the circuit through the coils 137, 144. A part of the current in the circuit 42 is shunted through these coils and they are both energized. The energizing of the coil 137 causes the shutter 123 to be withdrawn, as shown in Fig. 12, thus opening the wave receiver 4, and the energizing of the coil 144 causes the piston 152 to move to the right into the position shown in Fig. 12, this movement taking place against the action of the spring 154. The movement of the piston to the right brings the wedge block 155 against the switch 132 and breaks the circuit including the coil 125 at the contact 133. Said circuit is also broken at the contact 135 by the upward movement of the lever 31 and therefore the coil 125 is deënergized and the spring 138 will close the shutter 122.

The cylinder and piston 152 constitute a dash-pot to retard the movement of the wedge block 155, and for this purpose the cylinder may be filled with a liquid and the piston may have a small aperture therein which permits the liquid to pass from one side to the other thereof.

As soon as the wave receiver 4 has been focused on the distant object and has been brought to rest, all as above described, the magnet 33 is energized in a way to attract the lever 31, thus breaking the circuit 42 and also the circuit through the coils 137, 144, and closing the motor circuit 28. The breaking of the circuit through the coils 137, 144 results in deënergizing both coils and the spring 138 then closes the shutter 123 while the spring 154 operates to move the piston 152 to the left, thereby withdrawing the block 155. The movement of the piston, however, is slow and before the circuit is closed at 133, the wave receiver 3 will have begun its movement and will have been moved out of range of the distant object so that by the time the circuit is closed through the coil 125 and the shutter 122 is open, the distant object is out of line of said wave receiver 3, and said wave receiver will not be brought to rest until it has made another complete rotation unless some other distant object projecting transverse waves is sighted by said wave receiver during its complete rotation.

While I have illustrated herein two embodiments of my invention I do not wish to be limited thereto nor do I regard my invention as being limited to devices which can be operated with either ultra-violet rays or electrical waves, as with appropriate modifications an apparatus having the same principle of operation as that herein described can be used with any form of energy which is propagated in transverse waves. The device herein shown can be easily used in connection with ordinary light rays.

I believe that I am the first to provide a mechanism for indicating automatically both the direction and the distance of a distant object, and therefore I desire to claim this broadly.

Having fully described my invention, what I claim as new and desire to secure by Letters Patent is:—

1. The combination with means to project energy in the form of transverse waves, of automatic means situated at a distance from said projecting means and rendered operative by said transverse waves to indicate visually said distance.

2. The combination with means to project energy in the form of transverse waves, of automatic means situated at a distance from said projecting means and rendered operative by said transverse waves to indicate visually both the direction of said projecting means and the said distance.

3. A range-finding apparatus comprising means to project energy in the form of transverse waves from a point the distance of which from another point is to be determined, and distance-indicating means sensitive to said waves and situated at said latter point to receive them when projected from said first-named point.

4. A range-finding apparatus comprising means to project energy in the form of transverse waves from a point the distance of which from another point is to be determined, and electrical distance-indicating means to visually indicate said distance, said distance-indicating means being sensitive to said waves and situated to receive them when projected from said point.

5. In a device of the class described, the combination with a plurality of open circuits, of means to receive energy projected from a distant point in the form of transverse waves, and means to close one or another of said circuits that depending on the distance of said point by the action of the received waves.

6. In a device of the class described, the combination with a plurality of normally open circuits, of means rendered operative by energy projected from a distant point to close one or another of said circuits that depending on the distance of said point.

7. In a device of the class described, the combination with a plurality of normally open circuits, each corresponding to a certain distance, of means to receive energy in the form of transverse waves projected from a distant point, and means to close that circuit which corresponds to the distance between said point and the receiving means by the action of the waves received by said receiving means.

8. The combination with a wave receiver adapted to receive transverse waves, of means associated with said wave receiver and sensitive to transverse waves to detect the presence of such waves, and means rendered operative by such first named means to indicate the distance from which waves received by the wave receiver have been projected.

9. The combination with means to generate and project energy in the form of transverse waves, of a wave receiver adapted to receive such waves, and means associated with the wave receiver and sensitive to said waves to indicate the distance between the projecting means and the wave receiver.

10. The combination with a wave receiver constructed to receive at any one time transverse waves from one direction only, of means associated with said wave receiver and sensitive to said transverse waves to indicate the distance from which the transverse waves received by the wave receiver have been projected.

11. The combination with a wave receiver constructed to receive at any one time transverse waves from one direction only, of means to shift the position of said wave receiver, and means sensitive to said transverse waves to indicate the distance from which the waves received by the wave receiver have been projected.

12. The combination with a wave receiver in the form of a tube, of means within the tube to focus transverse waves projected into said tube, and means sensitive to said transverse waves to indicate the distance from which the waves have been projected.

13. The combination with a wave receiver in the form of a tube, of means within the tube to focus transverse waves projected thereinto, means controlled by the wave receiver to shift the angular position thereof, and means sensitive to said transverse waves to indicate when such waves have been projected into the wave receiver.

14. The combination with a wave receiver to receive transverse waves, means to turn said wave receiver about a vertical axis, a plurality of signal circuits corresponding to different angular positions of the wave receiver, means sensitive to transverse waves received by the wave receiver to render operative the signal in the circuit corresponding to the direction from which the waves have to come.

15. The combination with a wave receiver to receive transverse waves, means to turn said wave receiver about a vertical axis, a plurality of signal circuits corresponding to different angular positions of the wave receiver, means sensitive to transverse waves received by the wave receiver to render operative the signal in the circuit corresponding to the direction from which the waves have come, and means to bring the wave receiver to rest when any signal is rendered operative.

16. The combination with a wave receiver to receive transverse waves, means to turn said wave receiver about a vertical axis, a plurality of signal circuits corresponding to different angular positions of the wave receiver, means sensitive to transverse waves received by the wave receiver to render operative the signal in the circuit corresponding to the direction from which the waves have come, and automatic means to bring the wave receiver to rest when any signal is rendered operative.

17. The combination with two wave receivers, of means sensitive to transverse waves associated with both wave receivers to indicate the distance from which transverse waves received by said wave receiver have been projected, and means sensitive to transverse waves associated with one wave receiver to indicate the direction from which transverse waves received thereby have been projected.

18. The combination with a wave receiver adapted at any one time to receive transverse waves from one direction only, means to rotate said wave receiver about a vertical axis, means sensitive to transverse waves to indicate the angular position of said wave receiver from an assumed zero position when transverse waves are received thereby, a second wave receiver, means to rotate the latter about a vertical axis, and means sensitive to transverse waves associated with said wave receivers to indicate the distance from which transverse waves received thereby have been projected.

19. The combination with a horizontally-arranged tubular wave receiver, of means to rotate it about a vertical axis, means associated with said wave receiver sensitive to transverse waves to indicate the direction of the wave receiver when such waves are received thereby, means to stop the rotation of the wave receiver when transverse waves are thus received, a second horizontal tubular wave receiver, means to oscillate the latter wave receiver relative to the former when the latter has been brought to rest, and means associated with said latter wave receiver to indicate the direction thereof relative to the first mentioned receiver when transverse waves are received thereby.

20. The combination with a wave receiver constructed to receive at any one time transverse waves from one direction only, means to shift the position of said wave receiver, means associated with said wave receiver and sensitive to said transverse waves to indicate the distance from which any transverse waves received by said wave receiver have been projected, and means to maintain the indication for a length of time after the wave receiver has moved out of a position in which it can receive the waves which have caused the indication.

21. The combination with a wave receiver constructed to receive at any one time transverse waves from one direction only, of means to rotate said wave receiver, means associated with said wave receiver and sensitive to transverse waves to indicate the distance from which any such waves received by the wave receiver have been projected, and means to maintain said indication for a length of time after the wave receiver has moved out of a position in which it can receive the waves which have caused the indication.

22. The combination with a wave receiver constructed to receive at any one time transverse waves from one direction only, of means to rotate said wave receiver, means associated with said wave receiver and sensitive to transverse waves to indicate the distance from which any such waves received by the wave receiver have been projected, means to maintain said indication for a length of time after the wave receiver has moved out of a position in which it can receive the waves which have caused the indication, and means to render the indicating means inoperative after a complete rotation of the wave receiver.

23. The combination with a wave receiver, of means associated with said wave receiver and sensitive to energy in the form of waves to indicate the distance from which waves received by said wave receiver have been projected, and an automatically operating shutter coöperating with said wave receiver to exclude waves therefrom.

24. The combination with a wave receiver adapted to receive energy in the form of waves, of means associated with said wave receiver and sensitive to said waves to indicate the direction from which any waves received by the wave receiver have been projected, and an automatically operating shutter to exclude waves from said wave receiver.

25. The combination with a wave receiver, of means associated with said wave receiver and sensitive to energy in the form of waves to indicate the distance from which waves received by said wave receiver have been projected, a shutter coöperating with said wave receiver to exclude waves therefrom, and automatic means to operate said shutter.

26. The combination with a wave receiver adapted to receive energy in the form of waves, of means associated with said wave receiver and sensitive to said waves to indicate the direction from which any waves received by the wave receiver have been projected, a shutter to exclude waves from said wave receiver, and automatic means to operate said shutter.

27. The combination with a wave receiver in the form of a tube, of means within the tube to focus transverse waves projected thereinto, means to shift the angular position of the wave receiver, means sensitive to said transverse waves to indicate when such waves have been projected into the wave receiver, and an automatically operating shutter coöperating with said wave receiver to exclude transverse waves therefrom.

28. The combination with a wave receiver in the form of a tube, of means within the tube to focus transverse waves projected thereinto, means to shift the angular position of the wave receiver, means sensitive to said transverse waves to indicate when such waves have been projected into the wave receiver, a shutter coöperating with said wave receiver to exclude transverse waves therefrom, and automatic means to operate the shutter.

29. The combination with a wave receiver to receive transverse waves, means to turn said wave receiver about a vertical axis, a plurality of signal circuits corresponding to different angular positions of the wave receiver, means sensitive to transverse waves received by the wave receiver to render operative the signal in the circuit corresponding to the direction from which the waves have come, means to bring the wave receiver to rest when any signal is rendered operative, a shutter coöperating with said wave receiver to exclude transverse waves therefrom, and means to close said shutter when the wave receiver is brought to rest.

30. A range-finding apparatus comprising means sensitive to energy in the form of transverse waves and rendered operative by said transverse waves to indicate visually the distance from which said waves are projected.

31. A range-finding apparatus comprising means sensitive to energy in the form of transverse waves and rendered operative by said transverse waves to indicate visually both the direction and the distance from which said waves are projected.

32. A range-finding apparatus comprising electrical distance-indicating means sensitive to energy in the form of transverse waves and adapted to visually indicate the distance from which transverse waves projected from a distance are received.

In testimony whereof, I have signed my name to this specification, in the presence of two subscribing witnesses.

PERCY W. FULLER.

Witnesses:
AUGUST B. PRAETSCH,
LOUIS C. SMITH.